(12) United States Patent
Lee et al.

(10) Patent No.: US 7,602,274 B2
(45) Date of Patent: Oct. 13, 2009

(54) DYNAMIC CONFIGURATION OF A RADIO FREQUENCY TRANSPONDER

(75) Inventors: Thomas Youbok Lee, Chandler, AZ (US); James B. Nolan, Chandler, AZ (US); Steve Vernier, Phoenix, AZ (US); Ruan Lourens, Chandler, AZ (US); Vivien Delport, Chandler, AZ (US); Alan Lamphier, Elk Rapids, MI (US); Glen Allen Sullivan, Tempe, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 799 days.

(21) Appl. No.: 11/079,719

(22) Filed: Mar. 14, 2005

(65) Prior Publication Data

US 2005/0237163 A1    Oct. 27, 2005

Related U.S. Application Data

(60) Provisional application No. 60/564,828, filed on Apr. 23, 2004.

(51) Int. Cl.
*H04Q 5/22* (2006.01)
*G05B 19/00* (2006.01)
*G06F 7/04* (2006.01)
*H04B 1/00* (2006.01)

(52) U.S. Cl. .................. 340/10.2; 340/10.4; 340/10.51; 340/5.61; 340/426.36; 340/425.5; 342/27; 342/44

(58) Field of Classification Search .............. 340/10.2, 340/10.4, 10.51, 5.61, 5.2, 426, 426.36, 425.5, 340/539; 342/27, 44, 51; 180/287; 307/10.2
See application file for complete search history.

(56) References Cited

U.S. PATENT DOCUMENTS 5,774,062 A    6/1998   Ikefuji ................. 340/825.54
(Continued)

FOREIGN PATENT DOCUMENTS

EP         1087522        3/2001
(Continued)

OTHER PUBLICATIONS

Atmel Corporation, Ultra low power 125 kHz 3D—Wake-up receiver with RSSI, ATA5282 (Preliminary, REV A, Mar. 2003), ATMEL, pp. 1-22 (www.atmel.com/literature).*
(Continued)

*Primary Examiner*—Brian A Zimmerman
*Assistant Examiner*—Nam V Nguyen
(74) *Attorney, Agent, or Firm*—King & Spalding LLP

(57) ABSTRACT

A multi-channel remote keyless entry (RKE) transponder having dynamically re-configurable input channel selection, channel disable, settable sensitivity for each channel, wake-up filter timing parameters, automatic gain control hold, internal tuning capacitor selection for each channel's antenna, minimum modulation depth requirement for input signal and bi-directional talk-back. Programmable minimum modulation depth requirement reduces false wake-up of the RKE transponder. An antenna for each channel of the RKE transponder may be tuned with internal tuning capacitors for improved range and receiver sensitivity. The internal tuning capacitor parameters may be stored in a configuration register. Gain of the channel may be fixed while the antenna is tuned. The antennas may be de-queued for talk-back to a base station for low frequency bi-directional communications. An external control device may dynamically read from and write to the configuration registers via a serial communications interface.

91 Claims, 12 Drawing Sheets

U.S. PATENT DOCUMENTS

| | | | | |
|---|---|---|---|---|
| 6,054,925 | A * | 4/2000 | Proctor et al. | 340/572.7 |
| 6,272,321 | B1 | 8/2001 | Bruhnke et al. | 455/41 |
| 6,323,566 | B1 | 11/2001 | Meier | 307/10.2 |
| 6,489,886 | B2 * | 12/2002 | Meier | 340/426.1 |
| 6,509,825 | B1 * | 1/2003 | Smit et al. | 340/5.2 |
| 7,142,090 | B2 * | 11/2006 | Ueda et al. | 340/5.61 |

FOREIGN PATENT DOCUMENTS

| | | |
|---|---|---|
| WO | 0038107 | 6/2000 |

OTHER PUBLICATIONS

Texas Instrument Incorporation, Three-channel LF transceiver (3D AFE) TSM37122, pp. 1-73 (http://ti-rfid-com). 2001.*

Texas Instruments Incorporated, *Three-Channel LF Transceiver (3D AFE) TMS37122*; Texas Instruments Radio Frequency Identification Systems (http://www.ti-rfid.com).

Atmel Corporation, *Ultra Low Power 125 kHz 3D—Wake-up Receiver with RSSI, ATA5282* [*Preliminary*], ATMEL, pp. 1-22 (www.atmel.com/literature).

PCT International Search Report with Written Opinion, PCT/US2005/012789, 13 pages, Mailing Date Aug. 22, 2005.

Office Action from CN 2005800186851 dated Dec. 5, 2008.

* cited by examiner

| Bit Setting of Configuration Register 0 | | Wake-up Filter Timing (Output Enable Filter) | | |
|---|---|---|---|---|
| Bits (8:7) | Bits (6:5) | | | |
| WakH | WakL | TwakH (ms) | TwakL (ms) | TwakT (ms) |
| 01 | 00 | 1 | 1 | 3 |
| 01 | 01 | 1 | 1 | 3 |
| 01 | 10 | 1 | 2 | 4 |
| 01 | 11 | 1 | 4 | 6 |
| 10 | 00 | 2 | 1 | 4 |
| 10 | 01 | 2 | 1 | 4 |
| 10 | 10 | 2 | 2 | 5 |
| 10 | 11 | 2 | 4 | 8 |
| 11 | 00 | 4 | 1 | 6 |
| 11 | 01 | 4 | 1 | 6 |
| 11 | 10 | 4 | 2 | 8 |
| 11 | 11 | 4 | 4 | 10 |
| 00 | XX | Filter Disabled | | |

*Figure 7*

| Configuration 5 | | Min Modulation Depth Requirement | Signal level A | Signal level B |
|---|---|---|---|---|
| Bit 6 | Bit 5 | | | |
| 0 | 0 | 75% | 10 mVpp | 2.5 mVpp |
| 0 | 1 | 50% | 10 mVpp | 5 mVpp |
| 1 | 0 | 25% | 10 mVpp | 7.5 mVpp |
| 1 | 1 | 12% | 10 mVpp | 8.8 mVpp |

$$\text{Mod \%} = \frac{A - B}{A} \times 100\%$$

| | Bit 8 | Bit 7 | Bit 6 | Bit 5 | Bit 4 | Bit 3 | Bit 2 | Bit 1 | Bit 0 |
|---|---|---|---|---|---|---|---|---|---|
| Reg.0 | WAkH | | WAkL | | ALRTIND | LCZen | LCYen | LCXen | Parity |
| Reg.1 | CLK DIV | Data Out | LCX Tuning Capacitor | | | | | | Parity |
| Reg.2 | | | LCY Tuning Capacitor | | | | | | Parity |
| Reg.3 | | | LCZ Tuning Capacitor | | | | | | Parity |
| Reg.4 | LCX Sensitivity | | | | LCY Sensitivity | | | | Parity |
| Reg.5 | | MOD En/Dis | Min Modulation | | LCZ Sensitivity | | | | Parity |
| Reg.6 | Column Parity Register | | | | | | | | Parity |
| Reg.7 | Status Register | | | | | | | | Parity |

| Command | Address | Data | Row Parity | Description |
|---|---|---|---|---|
| Command only – Address and DATA are "Don't Care," but need to be clocked in regardless. | | | | |
| 000 | XXXX | XXXX XXXX | X | Clamp on – enable modulation circuit |
| 001 | XXXX | XXXX XXXX | X | Clamp off – disable modulation circuit |
| 010 | XXXX | XXXX XXXX | X | Enter Sleep mode (any other command wakes the device) |
| 011 | XXXX | XXXX XXXX | X | AGC Preserve On – to temporarily preserve the current AGC level |
| 100 | XXXX | XXXX XXXX | X | AGC Preserve Off – AGC again tracks strongest input signal |
| 101 | XXXX | XXXX XXXX | X | Soft Reset – resets various circuit blocks |
| Read Command – Data will be read from the specified register address. | | | | |
| 110 | 0000 | Config Byte 0 | P | General – options that may change during normal operations |
| 110 | 0001 | Config Byte 1 | P | LCX antenna tuning and LFDATA output format |
| 110 | 0010 | Config Byte 2 | P | LCY antenna tuning |
| 110 | 0011 | Config Byte 3 | P | LCZ antenna tuning |
| 110 | 0100 | Config Byte 4 | P | LCX and LCY sensitivity reduction |
| 110 | 0101 | Config Byte 5 | P | LCZ sensitivity reduction and modulation depth |
| 110 | 0110 | Column Parity | P | Column parity byte for Config Byte 0 -> Config Byte 5 |
| 110 | 0111 | Device Status | X | Device status – parity error; which input is active, etc. |
| Write command – Data will be written to the specified register address. | | | | |
| 111 | 0000 | Config Byte 0 | P | General – options that may change during normal operation |
| 111 | 0001 | Config Byte 1 | P | LCX antenna tuning and LFDATA output format |
| 111 | 0010 | Config Byte 2 | P | LCY antenna tuning |
| 111 | 0011 | Config Byte 3 | P | LCZ antenna tuning |
| 111 | 0100 | Config Byte 4 | P | LCX and LCY sensitivity reduction |
| 111 | 0101 | Config Byte 5 | P | LCZ sensitivity reduction and modulation depth |
| 111 | 0110 | Column Parity | P | Column parity byte for Config Byte 0 -> Config Byte 5 |
| 111 | 0111 | Not Used | X | Register is readable, but not writable |
| Note: "P" denotes the row parity bit (odd parity) for the respective data byte. | | | | |

*Figure 14*

DYNAMIC CONFIGURATION OF A RADIO FREQUENCY TRANSPONDER

RELATED PATENT APPLICATIONS

This application claims priority to commonly owned U.S. Provisional Patent Application Ser. No. 60/564,828; filed Apr. 23, 2004; entitled "Dynamic Configuration of a Radio Frequency Transponder," by Thomas Youbok Lee, James B. Nolan, Steve Vernier, Ruan Lourens, Vivien Delport, Alan Lamphier and Glen Allen Sullivan; which is hereby incorporated by reference herein for all purposes.

This application is related to commonly owned United States Patent Application Pub. No. US 2005/0237160; Ser. No. 11/079,765; filed Mar. 14, 2005; entitled "Reducing False Wake-Up in a Low Frequency Transponder," by James B. Nolan, Thomas Youbok Lee, Alan Lamphier, Ruan Lourens and Steve Vernier; United States Patent Application Pub. No. US 2005/0237220; Ser. No. 11/079,787; filed Mar. 14, 2005; now U.S. Pat. No. 7,209,030 B2; issued Apr. 24, 2007; entitled "Noise Alarm Timer Function for Three-Axis Low Frequency Transponder," by James B. Nolan, Thomas Youbok Lee, Steve Vernier and Alan Lamphier; and U.S. patent application Ser. No. 11/079,878; filed Mar. 14, 2005; entitled "Programmable Wake-Up Filter for Radio Frequency Transponder," by Thomas Youbok Lee, James B. Nolan, Steve Vernier, Randy Yach and Alan Lamphier; all of which are hereby incorporated by reference herein for all purposes.

FIELD OF THE INVENTION

The present invention relates generally to inductively coupled magnetic field transmission and detection systems, such as remote keyless entry (RKE) and passive keyless entry (PKE) systems, and more particularly to an apparatus and method for dynamically configuring parameters in such systems.

BACKGROUND OF THE INVENTION TECHNOLOGY

In recent years, the use of remote keyless entry (RKE) systems for automotive and security applications have increased significantly. The conventional remote keyless entry (RKE) system consists of a RKE transmitter and a base station. The RKE transmitter has activation buttons. When an activation button is pressed, the RKE transmitter transmits a corresponding radio frequency data to the base station. The base station receives the data and performs appropriate actions such as unlock/lock car doors or trunks if the received data is valid. In the conventional RKE systems, the data is transmitted from the RKE transmitter to the base station, but not from the base station to the transmitter. This is often called unidirectional communication.

Much more sophisticated RKE systems can be made by using a bidirectional communication method. The bidirectional remote keyless entry system consists of a transponder and a base station. The transponder and base station can communicate by themselves without human interface buttons. The base station sends a command to the transponder and the transponder can respond to the base station accordingly if the command is valid. By utilizing the bidirectional communication method, one can unlock/lock his/her car doors or trunks remotely without pressing any buttons. Therefore, a fully hands-free access to the room or car is now possible.

The bidirectional communication RKE system consists of base station and transponder. The base station can send and receive low frequency command/data, and also can receive VHF/UHF/Microwave signals. The transponder can detect the low frequency (LF) data and transmit data to the base station via low frequency or VHF/UHF/Microwave. In applications, the bidirectional transponder may have the activation buttons as optional, but can be used without any activation button, for example, to unlock/lock car doors, trunks, etc.

For a reliable hands-free operation of the transponder that can operate without human interface, the transponder must be intelligent enough on decision making for detecting input signals correctly and managing its operating power properly for longer battery life. The idea in this application describes the dynamic configuration of the transponder, that can reconfigure the transponder's feature sets any time during applications, to communicate with the base station intelligently by itself in the hand-free operation environment.

Referring to FIG. 1, depicted is a prior art passive remote keyless entry (RKE) system. These wireless RKE systems typically are comprised of a base station 102, which is normally placed in the vehicle in automobile applications, or in the home or office in security entrance applications, and one or more RKE transponders 104, e.g., key-fobs, that communicate with the base station 102. The base station 102 may comprise a radio frequency receiver 106, antenna 110 and, optionally, a low frequency transmitter/reader 108 and associated antenna 112. The transponder 104 may comprise a radio frequency transmitter 122, an encoder 124 coupled to the transmitter 122, antenna 118 and, optionally, a low frequency transponder 126 and associated antenna 120. The transmitter 122 may communicate with the receiver 106 by using very high frequency (VHF) or ultra high frequency (UHF) radio signals 114 at distances up to about 100 meters so as to locate a vehicle (not shown) containing the base station 102, locking and locking doors of the vehicle, setting an alarm in the vehicle, etc. The encoder 124 may be used to encrypt the desired action for only the intended vehicle. Optionally, the low frequency transponder 126 may be used for hands-free locking and unlocking doors of a vehicle or building at close range, e.g., 1.5 meters or less over a magnetic field 116 that couples between the coils 112 and 120.

The RKE transponder 104 is typically housed in a small, easily carried key-fob (not shown) and the like. A very small internal battery is used to power the electronic circuits of the RKE transponder when in use. The duty cycle of the RKE transponder must, by necessity, be very low otherwise the small internal battery would be quickly drained. Therefore to conserve battery life, the RKE transponder 104 spends most of the time in a "sleep mode," only being awakened when a sufficiently strong magnetic field interrogation signal is detected. The RKE transponder will awaken when in a strong enough magnetic field at the expected operating frequency, and will respond only after being thus awakened and receiving a correct security code from the base station interrogator, or if a manually initiated "unlock" signal is requested by the user (e.g., unlock push button on key-fob).

This type of RKE system is prone to false wake-up, short battery life, unreliable operating range that is too dependant upon orientation of the key fob (not shown). Thus, it is necessary that the number of false "wake-ups" of the RKE transponder circuits be keep to a minimum. This is accomplished by using low frequency time varying magnetic fields to limit the interrogation range of the base station to the RKE transponder. The flux density of the magnetic field is known as "field intensity" and is what the magnetic sensor senses. The field intensity decreases as the cube of the distance from the source, i.e., $1/d^3$. Therefore, the effective interrogation range of the magnetic field drops off quickly. Thus, walking through a shopping mall parking lot will not cause a RKE transponder to be constantly awakened. The RKE transponder will thereby be awakened only when within close proximity to the correct vehicle. The proximity distance necessary to wake up the RKE transponder is called the "read range." The VHF or UHF response transmission from the RKE transponder to the base station interrogator is effective at a much greater distance and at a lower transmission power level.

More and more intelligent features are being demanded by users of RKE systems. To meet these user demands the RKE transponder parameters must be dynamically re-configurable during use as input signal conditions and application purposes change.

Therefore, there is a need for a RKE transponder whose parameters may be dynamically re-configured.

SUMMARY OF THE INVENTION

The present invention overcomes the above-identified problems as well as other shortcomings and deficiencies of existing technologies by providing an apparatus, system and method for dynamically re-configuring parameters of a remote keyless entry (RKE) transponder. The parameters of the RKE transponder may be dynamically re-configured as input signal conditions and/or application purposes change.

In an exemplary embodiment, according to the present invention, a RKE transponder, comprises an analog front-end (AFE) having dynamically re-configurable parameters that may be programmed and stored in configuration registers. The contents of these configuration registers may be parity checked. The dynamically re-configurable parameters may be for example, but not limited to, input channel selection, individual channel disable, independently settable sensitivity for each channel, wake-up filter timing parameters, automatic gain control hold, internal tuning capacitor selection for each channel's antenna, minimum modulation depth requirement and bi-directional talk back. A status register may be read only and may be used to indicate which input channel caused a wake-up, indication of AGC activity, indication of whether an "Alert Output Low" is due to parity error or noise alarm timer, etc. Wake-up filter timing parameters may be programmed in a configuration register and the wake-up filter may use the programmed timing parameters stored in the wake-up filter timing configuration register for unique wake-up from a desired signal input. Some of the configuration registers may store a value for each channel's antenna tuning capacitance value. Some other configuration registers may store the sensitivity (gain) of each channel. Still another configuration register may store the minimum modulation depth requirement of an input signal. It is contemplated and within the scope of the invention that other and further parameters stored in the configuration registers may be programmed and/or read by an external control device, e.g., a digital processor, microprocessor, microcontroller, digital signal processor (DSP), application specific integrated circuit (ASIC), programmable logic array (PLA) and the like, via a serial communications interface.

The configuration registers may be read from and written to by the external control device via a serial communications interface, e.g., $I^2C$, CAN, SPI (Serial Peripheral Interface) and the like. Parity checking and parity error alarm may also be provided for the configuration registers. The configuration registers may be programmed by the external control device via, e.g., a command via the serial peripheral interface (SPI).

The SPI may utilize three signals: active low Chip Select ($\overline{CS}$), clock (SCK) and Serial Data (SDIO).

The functional operation of a RKE transponder may be based upon parameter values stored in configuration registers that are integral with the RKE transponder. The RKE transponder may have, for example but not limited to, three low frequency (LF) input channels to receive/transmit signals for operation from about 100 kHz to about 400 kHz frequency range. The configuration registers may be serial shift registers that may be read from and written to (programmed) by an external control device via a serial interface, e.g., SPI, at any time. Thus, the RKE transponder operation, antenna tuning capacitor selection, individual channel sensitivity, minimum modulation depth requirement, selective wake-up, channel enable/disable, etc., output data type (RF carrier or envelope detection) may be dynamically re-configurable.

There may be, for example, eight configuration registers (Register 0-7) used to dynamically configure parameters in the analog front-end (AFE) device functions by the external control device via the serial communications interface. These registers may be read and written to by the external control device via the serial communications interface. Each of these registers may have a row parity bit for checking the integrity of stored parameter values. The configuration registers may be arranged so that a one of the registers may be a read only status register and another one of the registers may be used for storing column parity bits to maintain data integrity of the registers. A parity error alarm may be generated if there is a parity error (row and/or column parity error) and this parity error alarm may be sent to the external control device via the serial communications interface. The external control device may take corrective action, e.g., reload the configuration registers with correct parameter data. It is also contemplated herein that more or less than eight configuration registers may be utilized, according to the present invention.

In specific embodiments of the present invention, data integrity of the configuration registers may be improved by implementing error detection, e.g., row and/or column parity bits. For example, there may be eight configuration registers, each of the configuration registers comprising nine bits. Therefore, the configuration registers may be arranged as an 8×9 memory map. The least significant bit (LSB) of each row may be designated as a row parity bit, and the bits in the 7th row (register 6) may be designated as column parity bits. Each bit of the column register (6) may be calculated over the respective column of configuration bits. The parity may be odd or even. The row and parity bits may be continuously checked, and if there is a parity error, a parity bit error message may be sent to the external control device, e.g., SCLK/Alert pin low. Error detection allows volatile registers to be used to store the configuration data that may then be reloaded upon detection of a parity error due to an initial power-up or brown-out condition. Thus, upon the occurrence of a parity error message the external control device can reload the configuration registers.

Communications from a base station may consist of a string of amplitude modulated signal pulses that are demodulated by the RKE device to produce a binary (off and on) data stream to be decoded by the external control device. If the amplitude modulation depth (difference between the strength of the signal carrier when "on" to the strength of the noise when the signal carrier is "off") is too weak (low), the demodulation circuit may not be able to distinguish a signal level high ("on") from a signal level low ("off"). A higher modulation depth results in a higher detection sensitivity. However, there is an advantage to having an adjustable detection sensitivity, depending upon an application and the signal conditions. Detection sensitivity may be controlled by setting the minimum modulation depth requirement for an incoming signal. Thus, decoding of an incoming signal may be based upon the strength of the signal to noise, i.e., signal+noise to noise ratio.

The minimum modulation depth requirement may be for example, but not limited to, 12 percent, 25 percent, 50 percent, 75 percent, etc. The incoming signal then must have a modulation depth (signal+noise)/noise) greater than the selected modulation depth to be detected. The minimum modulation depth requirement may be programmed (stored) in a configuration register, and may be reprogrammed at any time via an SPI interface command from the external control device.

In another embodiment, internal capacitors may be selected for tuning of the antennas for each of the X, Y and Z channels. The total available capacitance may be, for example, 63 pF, and may be selected in 1 pF steps. Each channel's antenna circuit may comprise an external inductor (L) and capacitor (C) connected in parallel and adapted to receive a LF base station signal. The parallel connected LC circuit forms a parallel resonant antenna. The resonant frequency of the LC antenna preferably should be at substantially the same frequency as the transmitting frequency of the LF base station. The closer the resonance frequency of the LC antenna to an incoming carrier signal from the LF base station, the more voltage will be developed at the LC antenna. As a result, lower power signals may be detected thereby giving the RKE device greater sensitivity for increased operating range.

Therefore, there is a need for being able to fine tune the resonance frequency of the RKE transponder antenna to be substantially at the operating frequency of the base station transmitter. The LC resonant frequency at the RKE transponder may be tuned for maximum sensitivity by tuning internal capacitance in 1 pF steps. The capacitance value found for best signal sensitivity may then be stored in the respective antenna tuning configuration register. Since the RKE transponder may have three input channels, each of the input channels has a parallel LC resonant circuit (LC antenna). The AFE device includes the antenna tuning capacitors for each input channel LC antenna. These tuning capacitors may be controlled in 1 pF steps by settings in the respective antenna tuning configuration registers.

In still another embodiment, the AFE and external control device are fabricated on different integrated circuit dies, and then are encapsulated into a common integrated circuit package. This allows significant cost and board-space savings in the fabrication of an RKE transponder. An external control device, e.g., standard digital processor, including KEELOQ (a registered trademark of Microchip Technology Corp.) peripheral, may be coupled with an AFE, according to the present invention, via a serial communications interface, e.g., SPI. There may be a plurality of inputs to the external control device for passive keyless entry (PKE) activation buttons for various RKE functions, e.g., doors, trunk, alarm, etc. The integrated circuit package may be any one of the small encapsulated packages, e.g., 20 lead plastic shrink small outline package (SSOP), etc.

In another embodiment, a 100 dB dynamic range amplitude modulation (AM) receiver is included in a three-channel AFE device. The three-channel AFE device transponder comprises for each of the channels a variable automatic gain control (AGC) attenuator, two-stage amplifier, a signal rectifier, input voltage limiter (for dequeuing of the coil) and common to all channels: a three-input peak detector, loop filter, and a configurable demodulator based on peak signal strength. Preferably, the AM receiver may automatically track the strongest signal on any of the three channels. The AGC may be comprised of two attenuators. A first attenuator may be connected to the antenna and also function as a voltage limiter. The first attenuator may handle a antenna voltage range from about 4 volts to about 400 volts. A second attenuator may handle signal inputs from about 4 millivolts to about 4 volts. The full-wave rectifiers and three-input peak detector are adapted to generate an output that is proportional to the strongest signal on any of the three channels. This output may be used by a loop filter to control the AGC so that the AM receiver maintains a desired output level. The output may also be used as part of a configurable data-slicer for demodulating the AM signal into data.

In yet another embodiment, an AFE device of a LF RKE transponder has an automatic gain control (AGC) hold function that allows the AGC to be "frozen" or "locked" so as to place the AFE at a certain fixed gain regardless of the strength of a received signal. For example, when a noise source is interfering with a channel, it could possibly swamp the channel and prevent normal communications from occurring on the other channels because the automatic gain control (AGC) of the RKE transponder, generally, will track the strongest channel signal. The external control device can recognize this condition using a noise alarm function, more fully described herein, to reduce the sensitivity of the noise corrupted channel so as to allow desired communications on the other channel(s). Another example is an undesirable noise source may cause a false wake-up of a RKE system when a RKE key fob is placed proximate to a computer or other noise source that may generate signal pulses at frequencies to which the RKE system is tuned. Thus, the digital controller may dynamically program each channel's gain as is appropriate in a noisy environment so as to reduce the time in which the external control device and other power drawing circuits are enabled (awake). The gain of each channel may be independently reduced by, for example, −30 dB. Another example is a hold function may be used for setting a fixed gain for the AFE when the antennas are being tuned to resonance at the base station transmitting frequency. The fixed gain may be under software control via a serial communications interface between the AFE and the external control device In another embodiment, a LF RKE transponder comprises a LF talk-back to the LF base station. An external control device may send data from the AFE device to the base station by clamping/unclamping the induced antenna voltage at the AFE device LC coil(s). The clamping and unclamping of the antenna voltage can be achieved by switching on and off a modulation transistor that is placed across each the coil of each AFE device antenna. The antenna voltage across the antenna is clamped or unclamped when the modulation transistor turns on or turns off, respectively. The changes in the antenna voltage caused by the modulation transistor actions can be detected by the base station, and, thus, the RKE transponder's modulation data can be reconstructed (detected) by a demodulator circuit in the base station. A special set of SPI commands from the external control device may be used to turn on and off the modulation transistor(s) across the LC antenna(s). The LF RKE transponder may be capable of operating at any frequency from about 100 kHz to about 400 kHz. The input channels of the LF transponder can independently receive incoming signals and also transmit data to the base station. This allows the LF AFE to have a low frequency bi-directional communication capability.

A technical advantage of the present invention is that each of the X, Y and Z channels may have an associated sensitivity adjustment control register in which the desired amplifier gain of the associated channel is dynamically programmed by the external control device through the serial interface.

Another technical advantage is that the dynamically programmable gain for each of the X, Y and Z channels may be used to desensitize an individual channel during noisy channel conditions, otherwise the channel noise source may cause the AFE and external control device to remain awake or be unnecessarily awakened, causing increased power consumption and thus reducing battery life.

Another technical advantage is that dynamic gain configuration for each of the X, Y and Z channels of the AFE may be used to improve communications with the base station by rejecting a noisy signal condition on a particular channel.

Another technical advantage is that control of each channel's sensitivity may be used to improve the balance of the three channels in a RKE system key fob so as to compensate for signal strength variations between the individual channel coils and parasitic effects that may be under user control.

Another technical advantage is software control differentiation between a strong signal and a weak signal such that the RKE system only communicates when a desired signal to noise ratio is present.

Another technical advantage is that a configurable minimum modulation depth requirement may be dynamically programmed into the configuration registers so as to insure adequate strength of a received signal for proper communications and to guarantee that there is an adequate signal to noise ratio of the incoming received signal before power consuming circuits are enabled ("wake-up").

Another technical is substantially eliminating false wake-up from unwanted noise that unnecessarily uses power and thus reduces battery life.

Another technical advantage is maintaining communications on the other channel(s) when a channel is unusable because of unwanted noise.

Still another technical advantage is using a noise alarm function to reduce power consumption and maintain communications.

Another technical advantage is differentiating between a strong signal and a weak signal so that only a strong signal will wake-up the power consuming circuits.

Yet another technical advantage is configuring minimum modulation depth requirements before enabling decoding of an incoming signal.

Another technical advantage is dynamically programming gain for each channel, signal strength necessary for activation, and/or configuration of modulation depth requirements with an external control device and storing these programmed parameters in configuration registers.

Other technical advantages should be apparent to one of ordinary skill in the art in view of what has been disclosed herein.

BRIEF DESCRIPTION OF THE DRAWINGS

A more complete understanding of the present disclosure and advantages thereof may be acquired by referring to the following description taken in conjunction with the accompanying drawings wherein:

FIG. 7 is a table showing exemplary wake-up filter timing parameter selections;

FIG. 14 is an exemplary table of SPI commands to the AFE transponder circuits and configuration registers thereof.

Figure 1:
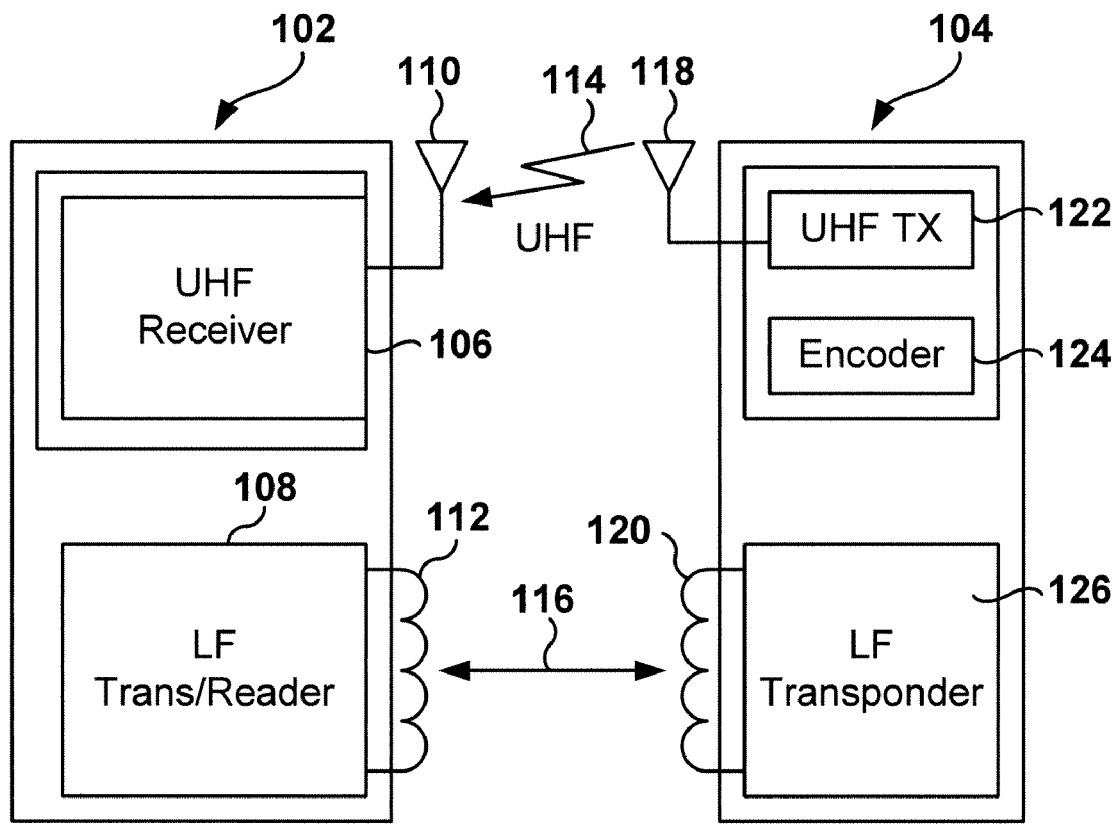
FIG. 1 is a schematic block diagram of a prior art remote keyless entry system.

The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

Referring now to the drawings, the details of exemplary embodiments of the present invention are schematically illustrated. Like elements in the drawing will be represented by like numbers, and similar elements will be represented by like numbers with a different lower case letter suffix.

Figure 2:
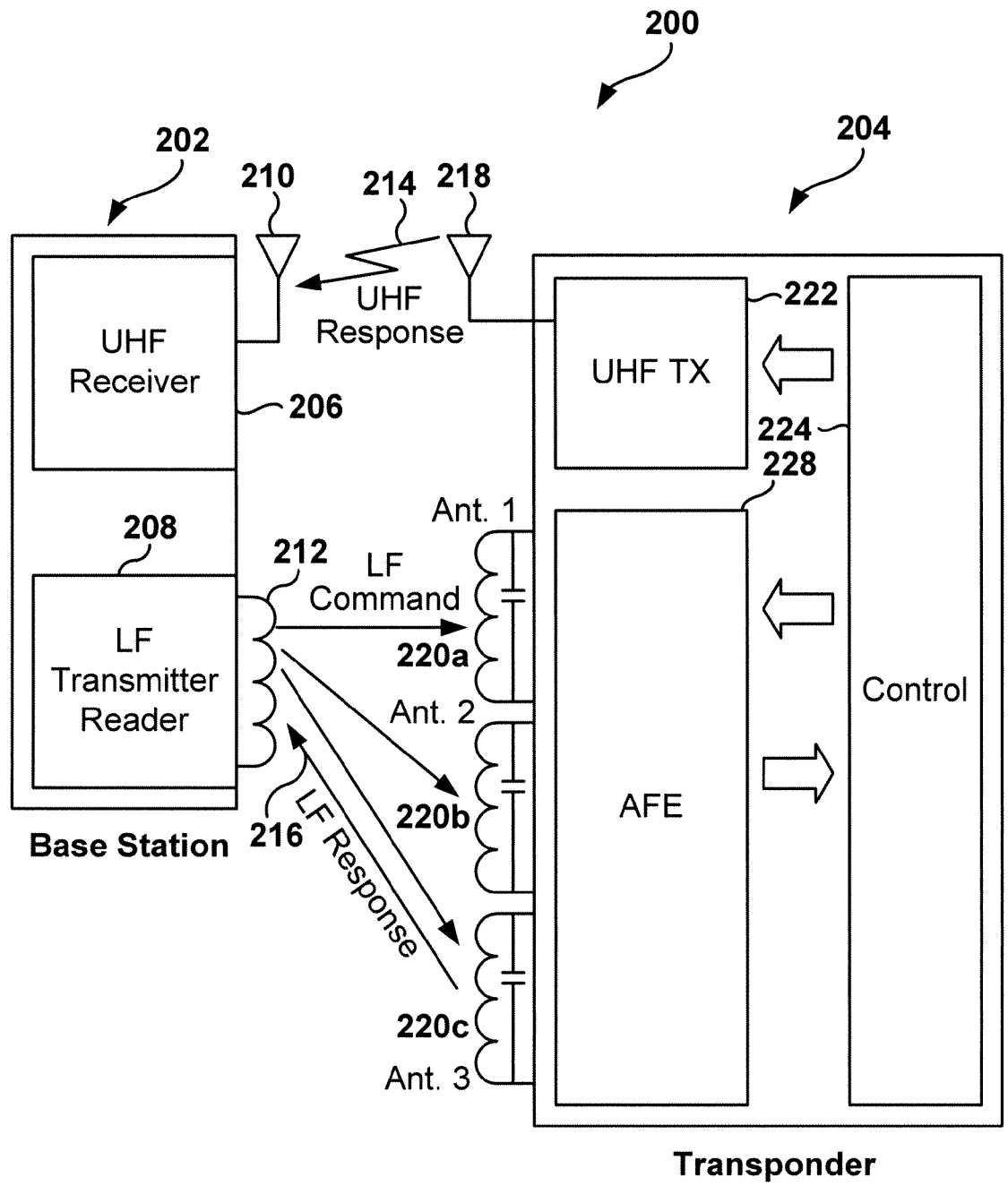
FIG. 2 is a schematic block diagram of an exemplary embodiment of a remote keyless entry system, according to the present invention.

Referring to FIG. 2, depicted is a schematic block diagram of an exemplary embodiment of a remote keyless entry (RKE) system, according to the present invention. The RKE system, generally represented by the numeral 200, comprises a base station 202, which is normally placed in the vehicle in automobile applications, or in the home or office in security entrance applications, and one or more RKE transponders 204, e.g., key-fobs, that communicate with the base station 202. The base station 202 may comprise a radio frequency receiver 206, antenna 210, and a low frequency transmitter/reader 208 and associated antenna 212. The transponder 204 may comprise a radio frequency transmitter 222, antenna 218, a low frequency analog front-end (AFE) 228, low frequency antennas 220a, 220b and 220c, and an external control device 224 coupled to the transmitter 222 and AFE 228.

The transmitter 222 may communicate with the receiver 206 by using very high frequency (VHF) or ultra high frequency (UHF) radio signals 214 at distances up to about 100 meters so as to locate a vehicle (not shown) containing the base station 202, locking and unlocking doors of the vehicle, setting an alarm in the vehicle, etc. The external control device 224 may encrypt the transmitting data to the base station. The low frequency AFE 228 may be used for hands-free locking and unlocking doors of a vehicle or building at close range, e.g., 1.5 meters or less over a magnetic field 216 that couples between coil 212, and coils 220a, 220b and/or 220c.

The RKE transponder 204 is typically housed in a small, easily carried key-fob (not shown) and the like. A very small internal battery may be used to power the electronic circuits of the RKE transponder 204 when in use (wake-up condition). The turn-on time (active time) of the RKE transponder 204 must, by necessity, be very short otherwise the small internal battery would be quickly drained. Therefore to conserve battery life, the RKE transponder 204 spends most of the time in a "sleep mode," only being awakened when a sufficiently strong magnetic field interrogation signal having a correct wake-up filter pattern is detected or an action button is pressed. The RKE transponder 204 will awaken when in the strong enough magnetic field 216 (above a sensitivity level), and with a correct wake-up filter pattern that matches the programmed values in the configuration register. Then the RKE transponder 204 will respond only after being thus awakened and receiving a correct command code from the base station interrogator, or if a manually initiated "unlock" signal is requested by the user (e.g., unlock push button on key-fob).

The base station 202 acts as an interrogator sending a command signal within a magnetic field 216, which can be identified by a RKE transponder 204. The RKE transponder 204 acts as a responder in two different ways: (1) the RKE transponder 204 sends its code to the base station 202 by UHF transmitter 222, or (2) the LF talk-back by clamping and unclamping of the LC antenna voltage. The base station 202 generates a time varying magnetic field at a certain frequency, e.g., 125 kHz. When the RKE transponder 204 is within a sufficiently strong enough magnetic field 216 generated by the base station 202, the RKE transponder 204 will respond if it recognizes its code, and if the base station 202 receives a correct response (data) from the RKE transponder 204, the door will unlock or perform predefined actions, e.g., turn on lights, control actuators, etc. Thus, the RKE transponder 204 is adapted to sense in a magnetic field 216, a time varying amplitude magnetically coupled signal at a certain frequency. The magnetically coupled signal carries coded information (amplitude modulation of the magnetic field), which if the coded information matches what the RKE transponder 204 is expecting, will cause the RKE transponder 204 to communicate back to the base station via the low frequency (LF) magnetic field 216, or via UHF radio link.

The flux density of the magnetic field is known as "magnetic field intensity" and is what the magnetic sensor (e.g., LC resonant antenna) senses. The field intensity decreases as the cube of the distance from the source, i.e., $1/d^3$. Therefore, the effective interrogation range of the magnetic field drops off quickly. Thus, walking through a shopping mall parking lot will not cause a RKE transponder to be constantly awakened. The RKE transponder will thereby be awakened only when within close proximity to the correct vehicle. The proximity distance necessary to wake up the RKE transponder is called the "read range." The VHF or UHF response transmission from the RKE transponder to the base station interrogator is effective at a much greater distance and at a lower transmission power level.

The read range is critical to acceptable operation of a RKE system and is normally the limiting factor in the distance at which the RKE transponder will awaken and decode the time varying magnetic field interrogation signal. It is desirable to have as long of a read range as possible. A longer read range may be obtained by developing the highest voltage possible on any one or more of the antenna (220a, 220b and/or 220c).

Maximum coil voltage is obtained when the base station coil 212 and any RKE transponder coil 220 are placed face to face, i.e., maximum magnetic coupling between them. Since the position of the RKE transponder 204 can be random, the chance of having a transponder coil 220 face to face with the base station coil 212 is not very good if the transponder 204 has only one coil 220 (only one best magnetic coil orientation). Therefore, exemplary specific embodiments of the present invention use three antennas (e.g., 220a, 220b and 220c) with the RKE transponder 204. These three antennas 220a, 220b and 220c may be placed in orthogonal directions (e.g., X, Y and Z) during fabrication of the RKE transponder 204. Thus, there is a much better chance that at least one of the three antennas 220a, 220b and 220c will be in substantially a "face-to-face" orientation with the base station coil 212 at any given time. As a result the signal detection range of the RKE transponder 204 is maximized thereby maximizing the read (operating) range of the RKE system 200.

In addition to a minimum distance required for the read range of the RKE key-fob 204, all possible orientations of the RKE key-fob 204 must be functional within this read range since the RKE key-fob 204 may be in any three-dimensional (X, Y, Z) position in relation to the magnetic sending coil 212 of the interrogator base station 208. To facilitate this three-dimensional functionality, X, Y and Z coils 220a, 220b and 220c, respectively, are coupled to the AFE 228, which comprises three channels of electronic amplifiers and associated circuits. Each of the three channels is amplified and coupled to a detector (FIG. 3) which detects the signals received from the X, Y and Z antennas 220a, 220b and 220c, respectively.

Figure 3:
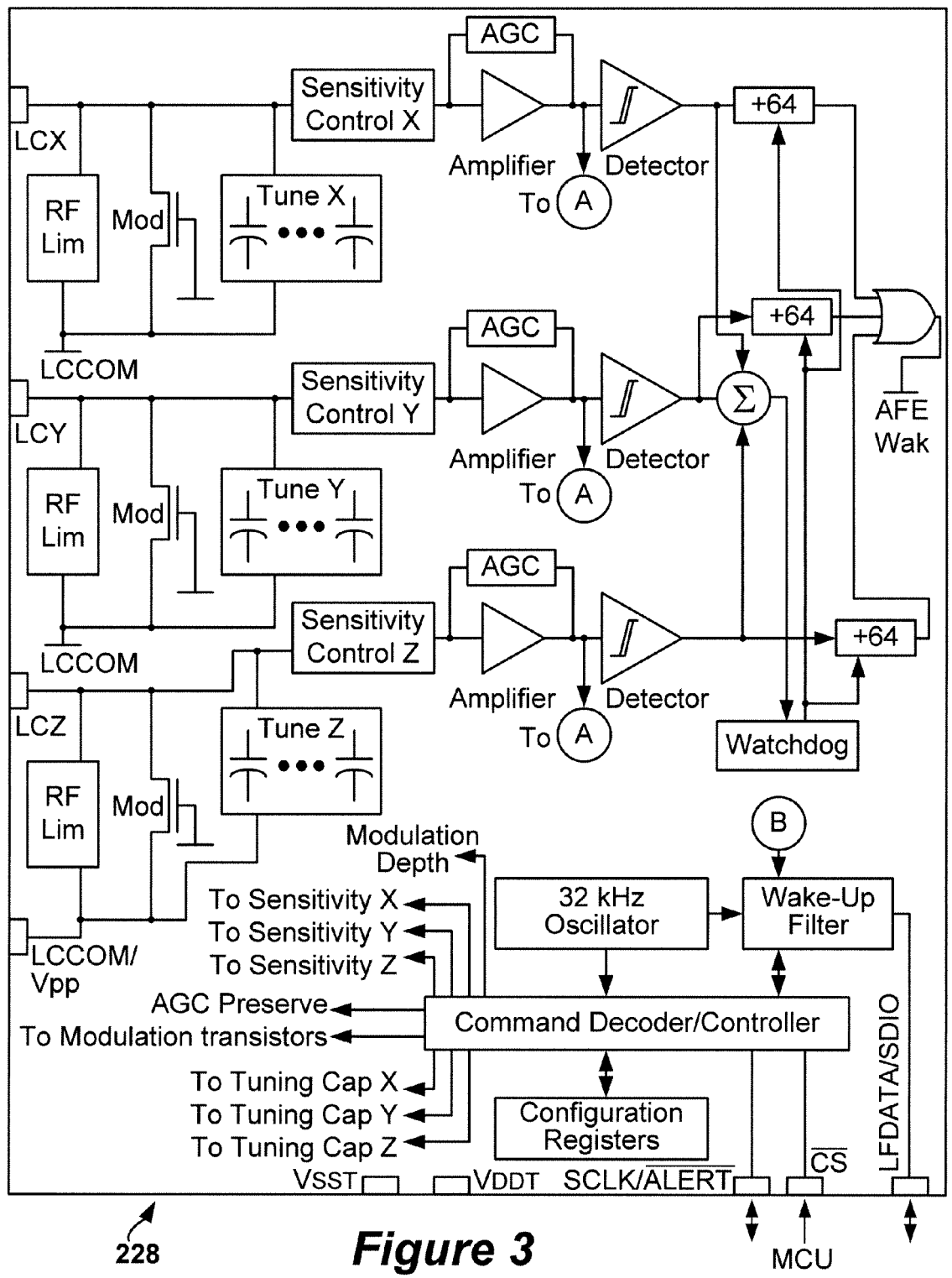
FIG. 3 is a schematic block diagram of the analog front-end (AFE) shown in FIG. 2.

Referring to FIG. 3, depicted is a schematic block diagram of the analog front-end (AFE) 228 shown in FIG. 2. The AFE 228 contains three analog-input channels and comprises amplifiers for these three channels, e.g., X, Y, Z. Each of these channels comprise radio frequency amplitude limiting, antenna tuning, sensitivity control, automatic gain controlled amplifier, and a detector. Each channel has internal tuning capacitance, sensitivity control, an input signal strength limiter, and automatic gain controlled amplifiers. The output of each channel is OR'd and fed into a demodulator. The demodulator output is fed into a wake-up filter, and available at the LFDATA pin if the data matches the programmed wake-up filter pattern. The demodulator contains a signal rectifier, low-pass filter and peak detector.

The detectors are coupled to a summer for combining the outputs of the three detectors. A wake-up filter, configuration registers and a command decoder/controller are also included in the AFE 228. X, Y and Z antennas 220a, 220b and 220c are coupled to the LCX, LCY and LCZ inputs, respectively, and one end of each of these antennas may be coupled to a common pin, LCCOM/Vpp pin.

The AFE 228 in combination with the X, Y and Z antennas 220a, 220b and 220c may be used for three-dimensional signal detection. Typical operating frequencies may be from about 100 kHz to 400 kHz. The AFE 228 may operate on other frequencies and is contemplated herein. Bi-directional non-contact operation for all three channels are contemplated herein. The strongest signal may be tracked and/or the signals received on the X, Y and Z antennas 220a, 220b and 220c may be combined, OR'd. A serial interface may be provided for communications with the external control device 224. Internal trimming capacitance may be used to independently tune each of the X, Y and Z antennas 220a, 220b and 220c. The wake-up filter may be configurable. Each channel has its own amplifier for sensitive signal detection. Each channel may have selectable sensitivity control. Each channel may be independently disabled or enabled. Each detector may have configurable minimum modulation depth requirement control for input signal. Device options may be set through configuration registers and a column parity bit register, e.g., seven 9-bit registers. These registers may be programmed via SPI (Serial Protocol Interface) commands from the external control device 224 (FIG. 2).

The following are signal and pin-out descriptions for the specific exemplary embodiment depicted in FIG. 3. One having ordinary skill in the art of electronics and having the benefit of this disclosure could implement other combinations of signals and pin-outs that would be within the spirit and scope of the present invention.

$V_{DDT}$: AFE positive power supply connection.

$V_{SST}$: AFE ground connection.

LCX: External LC interface pin in the X direction. This pin allows bi-directional communication over a LC resonant circuit.

LCY: External LC interface pin in the Y direction. This pin allows bi-directional communication over a LC resonant circuit.

LCZ: External LC interface pin in the Z direction. This pin allows bi-directional communication over a LC resonant circuit.

LCCOM: Common pin for LCX, LCY and LCZ antenna connection. Also used for test-mode supply input (Vpp).

LFDATA/CCLK/RSSI/SDIO: This is a multi-output pin that may be selected by the configuration register. LFDATA provides the combined digital output from the three demodulators. The SDI is the SPI digital input, when $\overline{CS}$ is pulled low. The SDO is the SPI digital output when performing a SPI read function of register data. RSSI is the receiver signal strength indicator output.

CCLK is detected carrier clock output.

SCLK/$\overline{ALERT}$: SCLK is the digital clock input for SPI communication. If this pin is not being used for SPI ($\overline{CS}$ pin is high) the $\overline{ALERT}$ open collector output indicates if a parity error occurred or if an ALARM timer time-out occurred.

$\overline{CS}$: Channel Select pin for SPI communications. The pin input is the SPI chip select-pulled low by the external control device to begin SPI communication, and raised to high to terminate the SPI communication.

Figure 4:
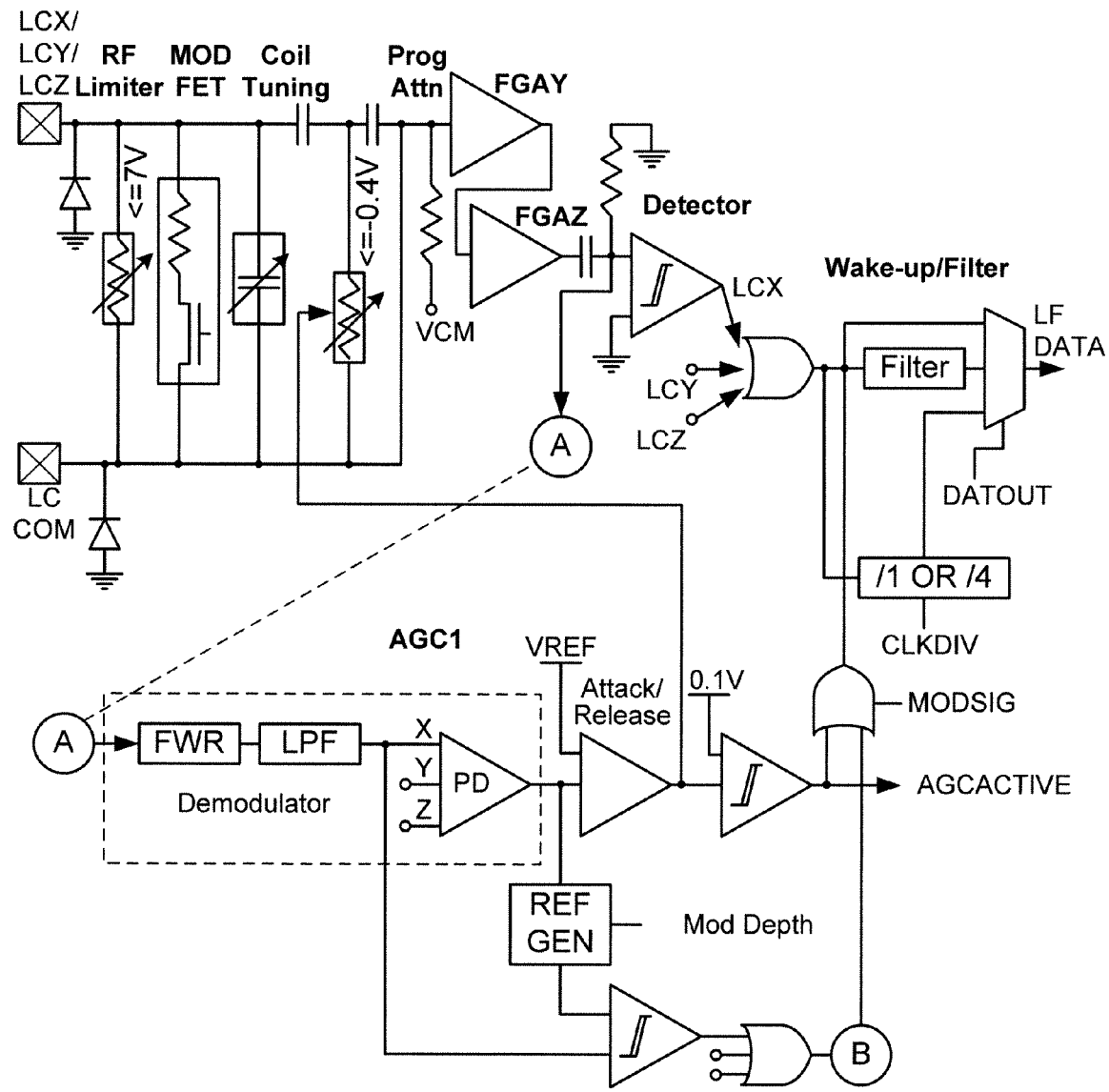
FIG. 4 is a schematic block diagram of a exemplary channel of the three channels, detector, wake-up filter and demodulator shown in FIG. 3.

Referring to FIG. 4, depicted is a schematic block diagram of a exemplary channel of the three channels, detector, wake-up filter and demodulator shown in FIG. 3. The following are functional descriptions for the specific exemplary embodiment depicted in FIG. 4. One having ordinary skill in the art of electronics and having the benefit of this disclosure could implement other combinations of signals and pin-outs that would be within the spirit and scope of the present invention.

RF LIMITER: Limits LC pin input voltage by de-Q'ing the attached LC resonant circuit. The absolute voltage limit is defined by the silicon process's maximum allowed input voltage. The limiter begins de-Q'ing the external LC antenna when the input voltage exceeds $V_{DE\_Q}$, progressively de-Q'ing harder to ensure the antenna input voltage does not exceed the pin's maximum input voltage, and also to limit the voltage range acceptable to the internal AGC circuit.

MODULATION FET: Used to "short" the LC pin to LCCOM, for LF talk-back purposes. The modulation FET is activated when the AFE receives the "Clamp On" SPI command, and is deactivated when the AFE receives the "Clamp Off" SPI command.

ANTENNA TUNING: Each input channel has 63 pF (1 pF resolution) of tunable capacitance connected from the LC pin to LCCOM. The tunable capacitance may be used to fine-tune the resonant frequency of the external LC antenna.

VARIABLE ATTENUATOR: Attenuates the input signal voltage as controlled by the AGC amplifier. The purpose of the attenuation is to regulate the maximum signal voltage going into the demodulator.

PROGRAMMABLE ATTENUATOR: The programmable attenuator is controlled by the channel's configuration register sensitivity setting. The attenuator may be used to desensitize the channel from optimum desired signal wake-up.

AGC (Automatic Gain Control): AGC controls the variable attenuator to limit the maximum signal voltage into the demodulator. The signal levels from all 3 channels may be combined such that the AGC attenuates all 3 channels uniformly in respect to the channel with the strongest signal.

FGA (Fixed Gain Amplifiers): FGA1 and FGA2 may provide a two-stage gain of about 40 dB.

DETECTOR: The detector senses the incoming signal to wake-up the AFE. The output of the detector switches digitally at the signal carrier frequency. The carrier detector is shut off following wake-up if the demodulator output is selected.

DEMODULATOR: The demodulator consists of a full-wave rectifier, low pass filter, and peak detector that demodulates incoming amplitude modulation signals.

WAKE-UP FILTER: The wake-up filter enables the LFDATA output once the incoming signal meets the wake-up sequence requirements.

DATA SLICER: The data slicer compares the input with the reference voltage. The reference voltage comes from the modulation depth setting and peak voltage.

Referring now to both FIG. 3 and FIG. 4, the AFE 228 may have an internal 32 kHz oscillator. The oscillator may be used in several timers: inactivity timer, alarm timer, pulse width timer—wake-up filter high and low, and period timer—wake-up filter. The 32 kHz oscillator preferably is low power, and may comprise an adjustable resistor-capacitor (RC) oscillator circuit. Other types of low power oscillators may be used and are contemplated herein.

The inactivity timer may be used to automatically return the AFE 228 to standby mode by issuing a soft reset if there is no input signal before the inactivity timer expires. This is called "inactivity time out" or T$_{INACT}$. The inactivity timer may be used is to minimize AFE 238 current draw by automatically returning the AFE 228 to the lower current standby mode if a spurious signal wakes the AFE 228, doing so without waking the higher power draw external control device 224. The inactivity time may be reset when: receiving a low frequency (LF) signal, $\overline{CS}$ pin is low (any SPI command), or a timer-related soft reset. The inactivity time may start when there is no LF signal detected. The inactivity time may cause a AFE 228 soft reset when a previously received LF signal is absent for T$_{INACT}$. The soft reset may return the AFE 228 to standby mode where the AGC, demodulator, RC oscillator and such are powered-down. This may return the AFE 228 to the lower standby current mode.

The alarm timer may be used to notify the external control device 224 that the AFE 228 is receiving a LF signal that does not pass the wake-up filter requirement—keeping the AFE 228 in a higher than standby current draw state. The purpose of the alarm timer is to minimize the AFE 228 current draw by allowing the external control device 224 to determine whether the AFE 228 is in the continuous presence of a noise source, and take appropriate actions to "ignore" the noise source, perhaps lowering the channel's sensitivity, disabling the channel, etc. If the noise source is ignored, the AFE 228 may return to a lower standby current draw state. The alarm timer may be reset when: $\overline{CS}$ pin is low (any SPI command), alarm timer-related soft reset, wake-up filter disabled, LFDATA pin enabled (signal passed wake-up filter). The alarm timer may start when receiving a LF signal. The alarm timer may cause a low output on the $\overline{ALERT}$ pin when it receives an incorrect wake-up command, continuously or periodically, for about 32 milliseconds. This is called "Alarm Time-out" or $T_{ALARM}$. If the LF signal is periodic and contains an absence of signal for greater than $T_{INACT}$, the inactivity timer time out will result in a soft reset—no $\overline{ALERT}$ indication may be issued.

Figure 5:
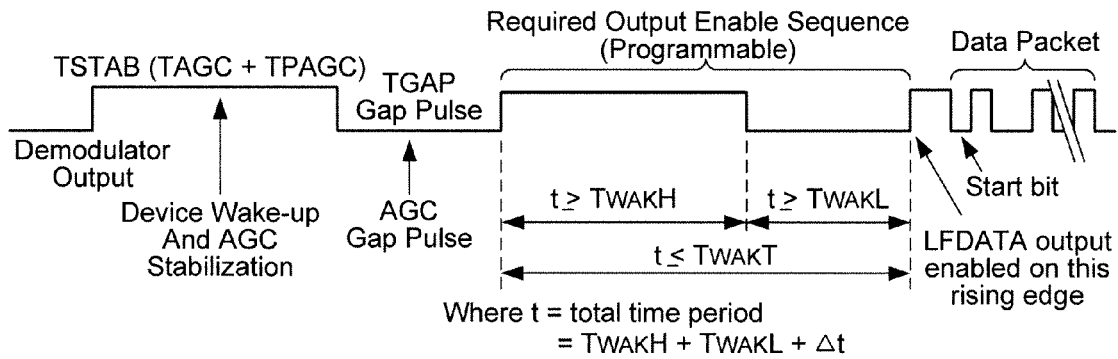
FIG. 5 is a schematic timing diagram of an exemplary wake-up sequence.
Figure 6:
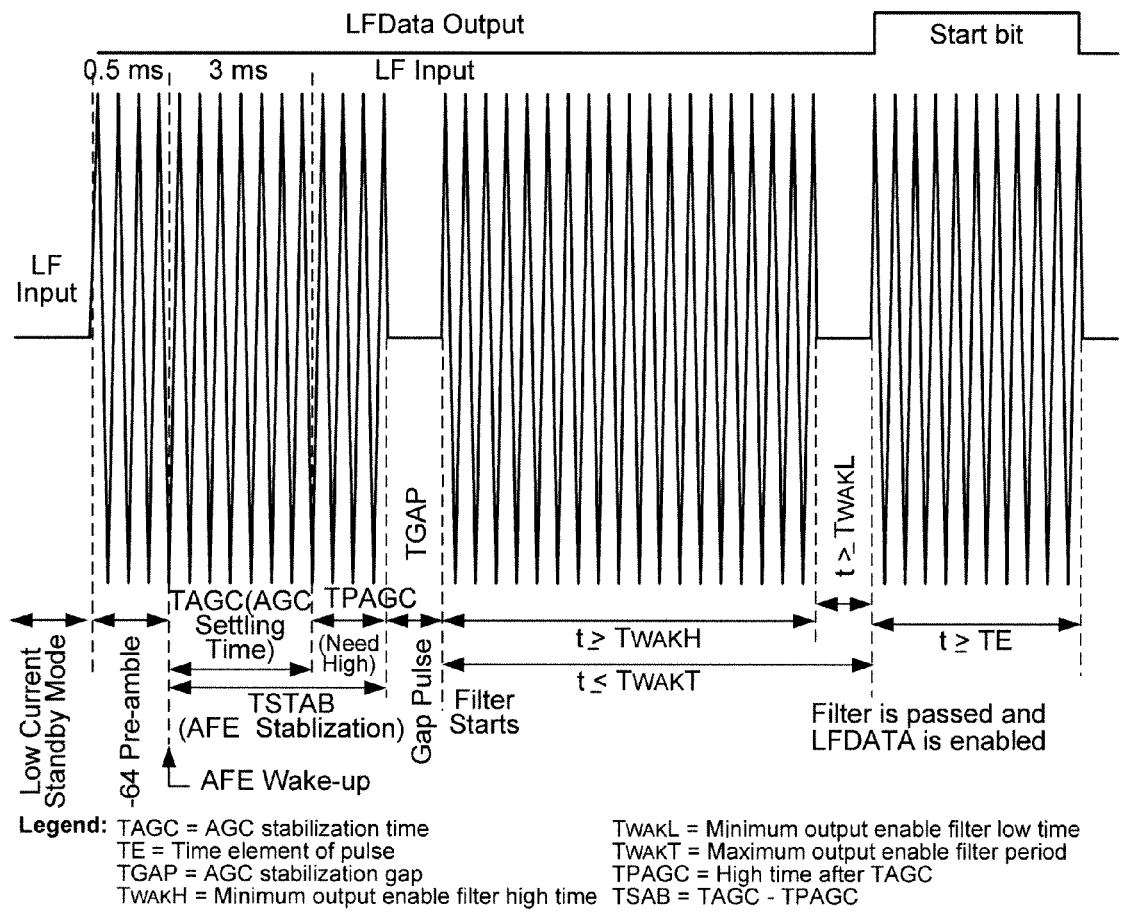
FIG. 6 is a schematic waveform diagram of the wake-up timing sequence shown in FIG. 5.

Referring to FIGS. 5 and 6, FIG. 5 depicts a schematic timing diagram of an exemplary wake-up sequence and FIG. 6 depicts a schematic waveform diagram of the exemplary wake-up timing sequence shown in FIG. 5. The pulse width (pulse time period) timer may be used to verify the received wake-up sequence meets both the minimum Wake-up High Time ($T_{WAKH}$) and minimum Wake-up Low Time ($T_{WAKL}$) requirements. The period timer may be used to verify the received wake-up sequence meets the maximum $T_{WAKT}$ requirement.

The configurable smart wake-up filter may be used to prevent the AFE 228 from waking up the external control device 224 due to unwanted input signals such as noise or incorrect base station commands. The LFDATA output is enabled and wakes the external control device 224 once a specific sequence of pulses on the LC input/detector circuit has been determined. The circuit compares a "header" (or called wake-up filter pattern) of the demodulated signal with a pre-configured pattern, and enables the demodulator output at the LFDATA pin when a match occurs. For example, The wake-up requirement consists of a minimum high duration of 100% LF signal (input envelope), followed by a minimum low duration of substantially zero percent of the LF signal. The selection of high and low duration times further implies a maximum time period. The requirement of wake-up high and low duration times may be determined by data stored in one of the configuration registers that may be programmed through the SPI interface. FIG. 7 is a table showing exemplary wake-up filter timing parameter selections that may be programmed into a configuration register so that each RKE transponder will wake-up. The wake-up filter may be enabled or disabled. If the wake-up filter is disabled, the AFE 228 outputs whatever it has demodulated. Preferably, the wake-up filter is enabled so that the external device or microcontroller unit 224 will not wake-up by an undesired input signal.

While timing the wake-up sequence, the demodulator output is compared to the predefined wake-up parameters. Where:

$T_{WAKH}$ is measured from the rising edge of the demodulator output to the first falling edge. The pulse width preferably falls within $T_{WAKH}=t=T_{WAKT}$.

$T_{WAKL}$ is measured from the falling edge of the demodulator output to the first rising edge. The pulse width preferably falls within $T_{WAKL}=t=T_{WAKT}$.

$T_{WAKT}$ is measured from rising edge to rising edge, i.e., the sum of $T_{WAKH}$ and $T_{WAKL}$. The pulse width of $T_{WAKH}$ and $T_{WAKL}$ preferably is $t=T_{WAKT}$.

The configurable smart wake-up filter may reset, thereby requiring a completely new successive wake-up high and low period to enable LFDATA output, under the following conditions.

The received wake-up high is not greater than the configured minimum $T_{WAKH}$ value.

The received wake-up low is not greater than the configured minimum $T_{WAKL}$ value.

The received wake-up sequence exceeds the maximum $T_{WAKT}$ value:

$T_{WAKH}+T_{WAKL}>T_{WAKT}$; or $T_{WAKH}>T_{WAKT}$; or $T_{WAKL}>T_{WAKT}$

Soft Reset SPI command is received.

If the filter resets due to a long high ($T_{WAKH}>T_{WAKT}$), the high pulse timer may not begin timing again until after a low to high transition on the demodulator output.

Figure 8:
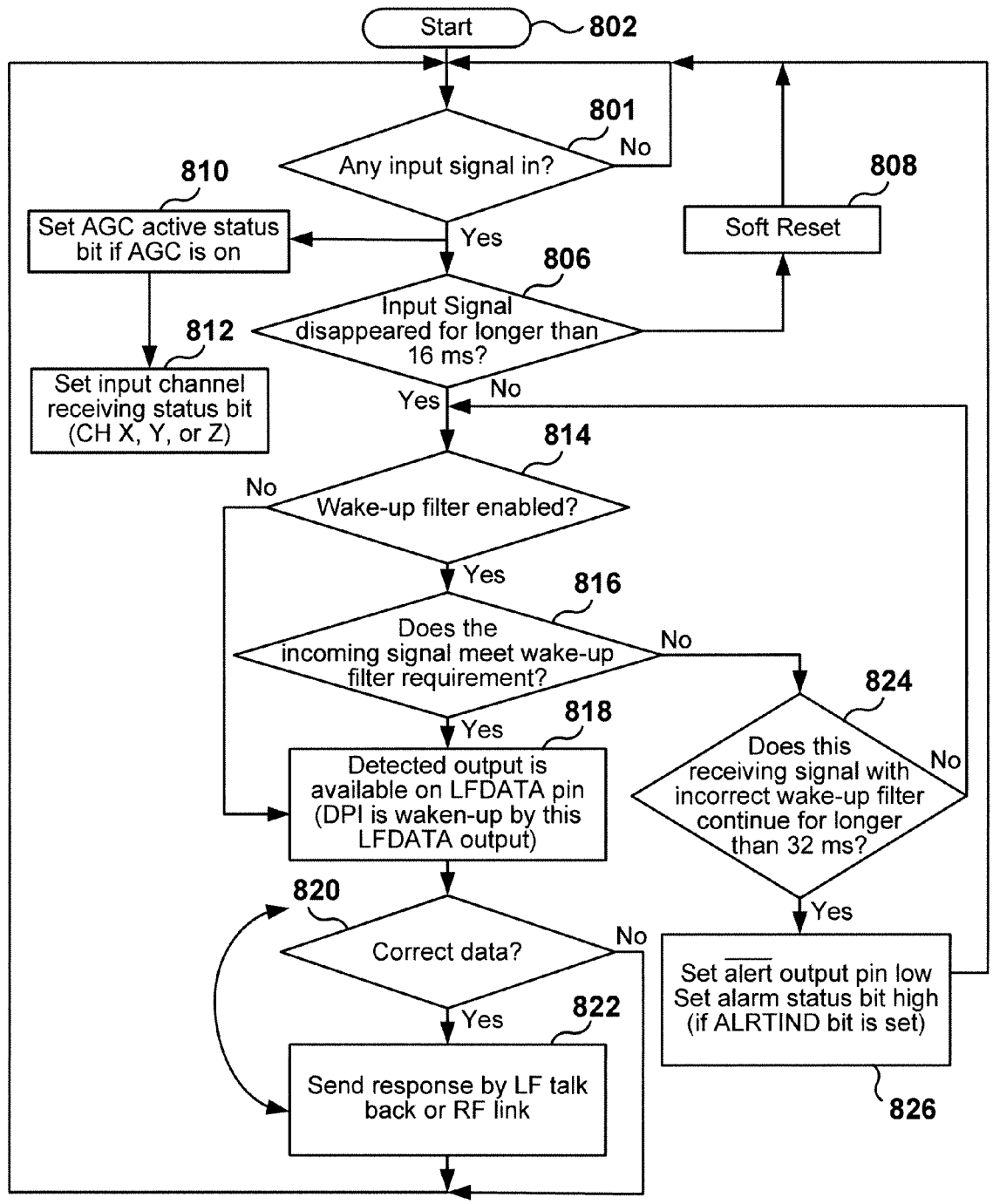
FIG. 8 is an exemplary flow diagram of determining whether a received signal meets the wake-up filter requirements.

Referring to FIG. 8, depicted is an exemplary flow diagram of determining whether a received signal meets the wake-up filter requirements. In step 802, the wake-up filter is in an inactive state. Step 804 checks for a LF input signal and when a LF input signal is present, step 810 sets the AGC active status bit if the AGC is on. The step 812 sets the input channel receiving status bit for channel X, Y and/or Z. Step 806 checks if the LF input signal is absent for longer than 16 milliseconds. If so, step 808 will do a soft reset and return to step 804 to continue checking for the presence of a LF input signal.

In step 806, if the LF input signal is not absent for longer than 16 milliseconds then step 814 determines whether to enable the wake-up filter. If the wake-up filter is enabled in step 814, then step 816 determines whether the incoming LF signal meets the wake-up filter requirement. If so, step 818 makes the detected output available on the LFDATA pin and the external control device 224 is awakened by the LFDATA output. Step 820 determines whether the data from the LFDATA pin is correct and if so, in step 822 a response is send back via either the LF talk back or by a UHF radio frequency link.

Figure 9:
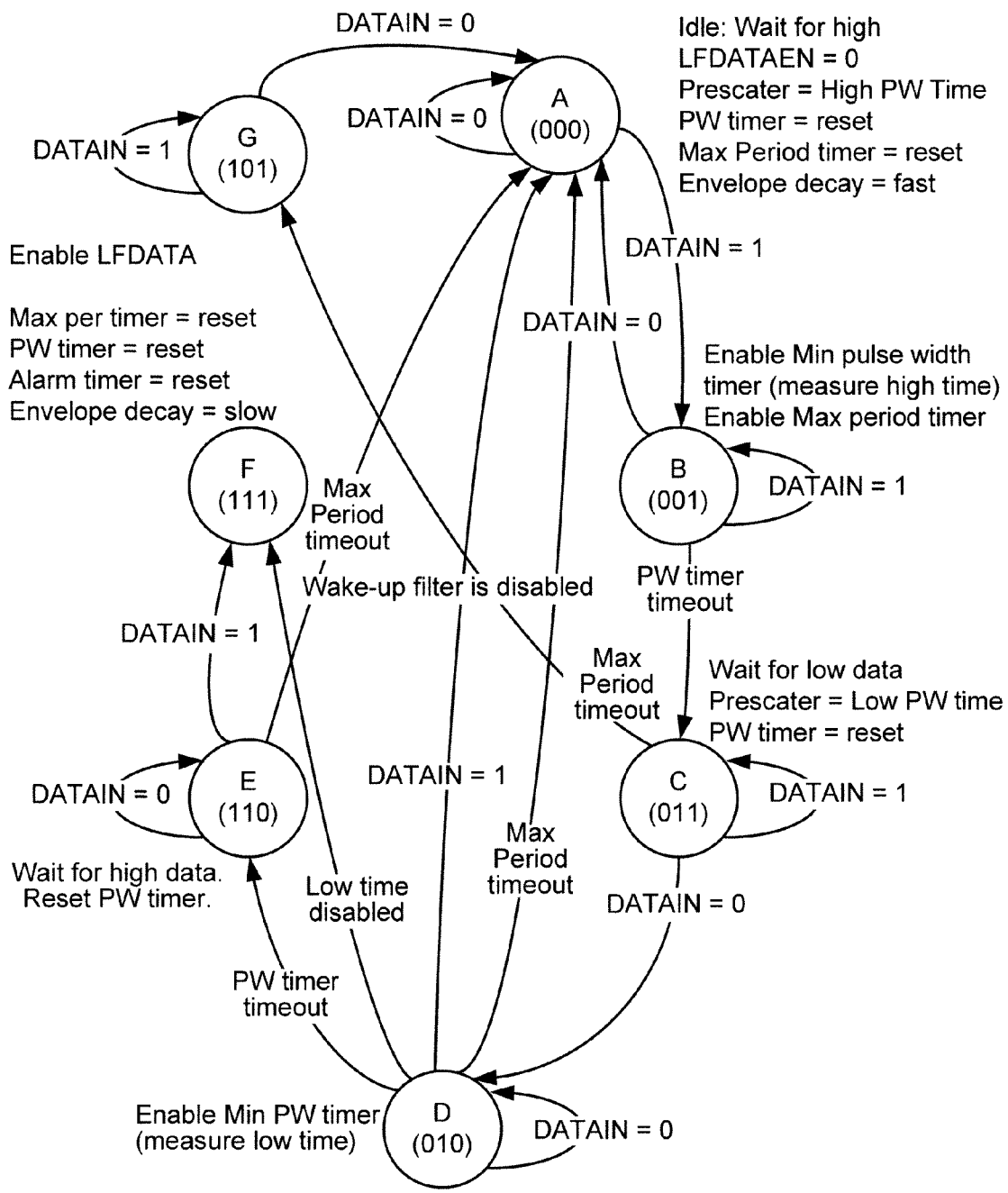
FIG. 9 is an exemplary state diagram for operation of the wake-up filter.

In step 816, if the incoming LF signal does not meet the wake-up filter requirement then step 824 determines whether the received incorrect wake-up command (or signal) continue for longer than 32 milliseconds. If not, then step 816 repeats determining whether the incoming LF signal meets the wake-up filter requirement. In step 824, if the received incorrect wake-up command continues for longer than 32 milliseconds then step 826 sets an alert output and step 816 continues to determine whether the incoming LF signal meets the wake-up filter requirement. Referring to FIG. 9, depicted is an exemplary state diagram for operation of the wake-up filter.

Referring back to FIG. 3, the AFE 228 may provide independent sensitivity control for each of the three channels. The sensitivity control may be adjusted at any time of operation by programming the AFE 228 configuration registers. Sensitivity control may set in a one of the configuration registers for each channel, and may provide a sensitivity reduction, for example, from about 0 dB to about −30 dB. Each channel may have its own sensitivity control from about 0 dB to about −30 dB by programming one of the configuration registers.

Each channel can be individually enabled or disabled by programming the configuration registers in the analog front-end device (AFE) 228. If the channel is enabled, all circuits in the channel become active. If the channel is disabled, all circuits in the disabled channel are inactive. Therefore, there is no output from the disabled channel. The disabled channel draws less battery current than the enabled channel does. Therefore, if one channel is enabled while other two channels are disabled, the device consumes less operating power than when more than one channel is enabled. There are conditions that the device may perform better or save unnecessary operating current by disabling a particular channel during operation rather than enabled. All three channels may be enabled in the default mode when the device is powered-up initially or from a power-on reset condition. The external device or microcontroller unit 224 may program the AFE 228 configuration registers to disable or enable individual channels if necessary any time during operation.

The AFE 228 may provide independent enable/disable configuration of any of the three channels. The input enable/disable control may be adjusted at any time for each channel, e.g., through firmware control of an external device. Current draw may be minimized by powering down as much circuitry as possible, e.g., disabling an inactive input channel. When an input channel is disabled, amplifiers, detector, full-wave rectifier, data slicer, comparator, and modulation FET of this channel may be disabled. Minimally, the RF input limiter should remain active to protect the silicon from excessive input voltages from the antenna.

Each antenna 220 may be independently tuned in steps of 1 pF, from about 0 pF to 63 pF. The tuning capacitance may be added to the external parallel LC antenna circuit.

The automatic gain controlled (AGC) amplifier may automatically amplify input signal voltage levels to an acceptable level for the demodulator. The AGC may be fast attack and slow release, thereby the AGC tracks the carrier signal level and not the amplitude modulated data bits on the carrier signal. The AGC amplifier preferably tracks the strongest of the three input signals at the antennas. The AGC power is turned off to minimize current draw when the SPI Soft Reset command is received or after an inactivity timer time out. Once powered on, the AGC amplifier requires a minimum stabilization time ($T_{STAB}$) upon receiving input signal to stabilize.

Figure 10:
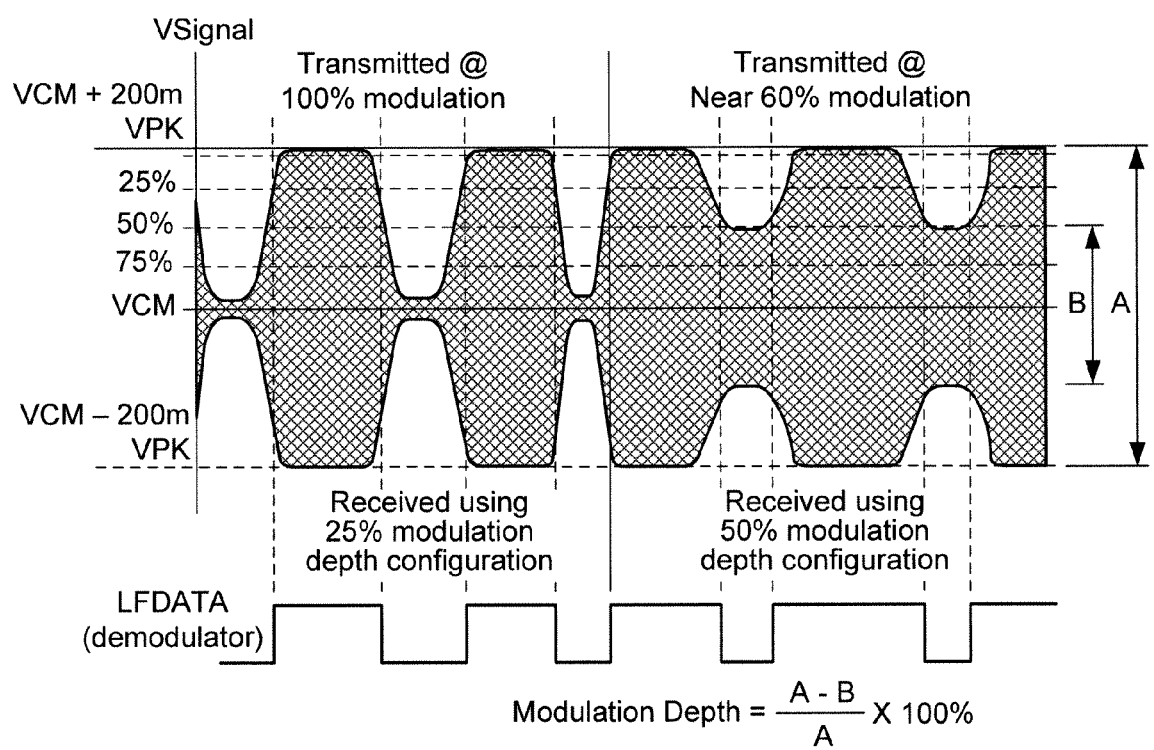
FIG. 10 is a schematic signal level diagram of modulation depth examples, according to the present invention.
Figure 11:
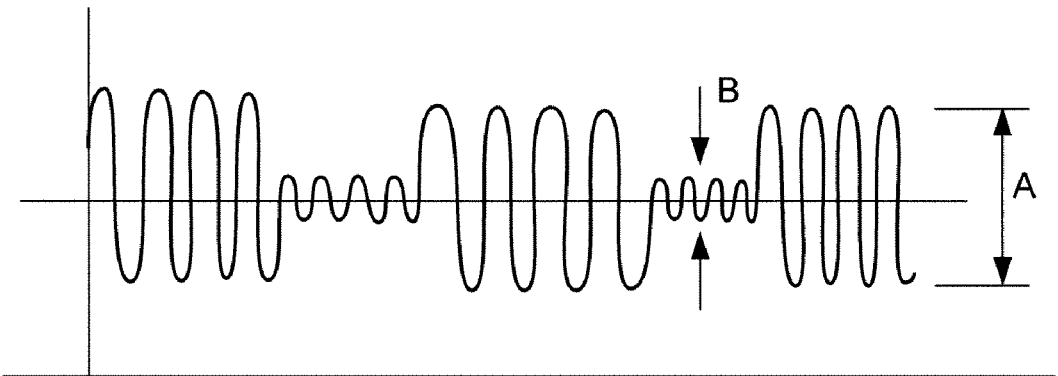
FIG. 11 is a table showing options for minimum modulation depth requirements and examples thereof.

Referring to FIG. 10, depicted is a schematic signal level diagram of modulation depth examples, according to the present invention. Configurable minimum modulation depth requirement for input signal defines what minimum percentage an incoming signal level must decrease from it's amplitude peak to be detected as a data low.

The AGC amplifier will attempt to regulate a channel's peak signal voltage into the data slicer to a desired $V_{AGCREG}$—reducing the input path's gain as the signal level attempts to increase above $V_{AGCREG}$, and allowing full amplification on signal levels below $V_{AGCREG}$.

The data slicer detects signal levels above $V_{THRESH}$, where $V_{THRESH} < V_{AGCREG}$. $V_{THRESH}$ effectively varies with the configured minimum modulation depth requirement configuration. If the minimum modulation depth requirement is configured to 50%, $V_{THRESH} = \frac{1}{2} V_{AGCREG}$, signal levels from 50% to 100% below the peak ($V_{AGCREG}$) will be considered as data low.

Only when the signal level is of sufficient amplitude that the resulting amplified signal level into the data slicer meets or exceeds $V_{AGCREG}$, will the AFE 228 be able to guarantee the signal meets the minimum modulation depth requirement. The minimum modulation depth requirements are not met when signal levels into the data slicer exceed $V_{THRESH}$, but are less than $V_{AGCREG}$.

Figures 12, 13:
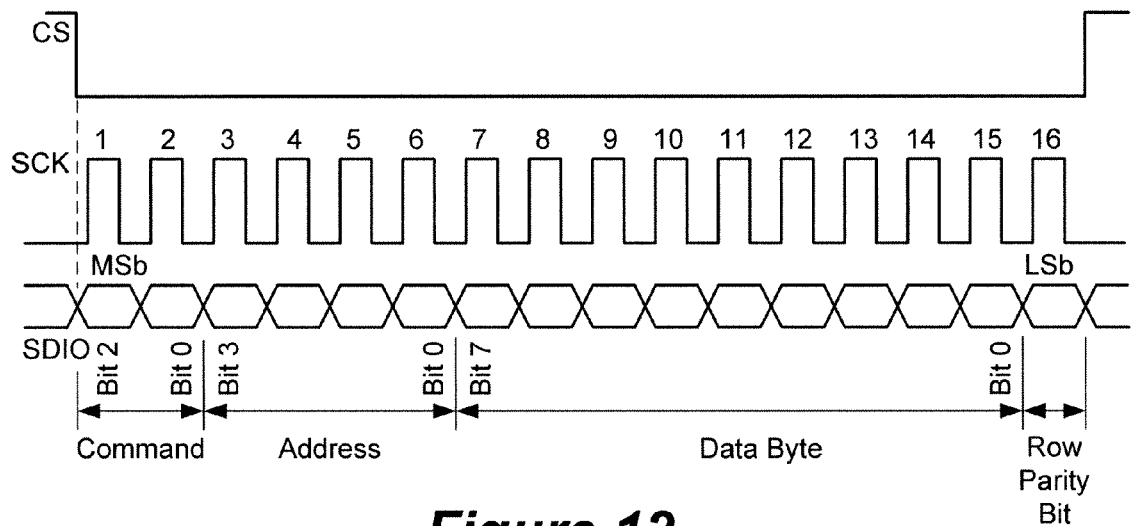
FIG. 12 is an exemplary SPI timing diagram.
FIG. 13 is an exemplary table showing the bit organization of the of configuration registers.

If the SSTR bit is set in the configuration register 5 as shown in FIG. 13, the demodulated output is inhibited unless the input level is greater than the AGC threshold level, which may be approximately about 15 millivolts peak-to-peak. This will produce detection of only signals have higher signal to noise ratios, resulting in less false wake-up, but at a loss in sensitivity determined by the minimum modulation depth requirement setting. The trade-off is between sensitivity and signal to noise ratio.

The present invention is capable of low current modes. The AFE 228 is in a low current sleep mode when, for example, the digital SPI interface sends a Sleep command to place the AFE 228 into an ultra low current mode. All but the minimum circuitry required to retain register memory and SPI capability will be powered down to minimize the AFE 228 current draw. Any command other than the Sleep command or Power-On Reset will wake the AFE 228. The AFE 228 is in low current standby mode when substantially no LF signal is present on the antenna inputs but the device is powered and ready to receive. The AFE 228 is in low-current operating mode when a LF signal is present on an LF antenna input and internal circuitry is switching with the received data.

The AFE 228 may utilize volatile registers to store configuration bytes. Preferably, the configuration registers require some form of error detection to ensure the current configuration is uncorrupted by electrical incident. The configuration registers default to known values after a Power-On-Reset. The configuration bytes may then be loaded as appropriate from the external control device 224 via the SPI digital interface. The configuration registers may retain their values typically down to 1.5V, less than the reset value of the external control device 224 and the Power-On-Reset threshold of the AFE 228. Preferably, the external control device 224 will reset on electrical incidents that could corrupt the configuration memory of the AFE 228. However, by implementing row and column parity that checks for corruption by an electrical incident of the AFE 228 configuration registers, will alert the external control device 224 so that corrective action may be taken. Each configuration byte may be protected by a row parity bit, calculated over the eight configuration bits.

The configuration memory map may also include a column parity byte, with each bit being calculated over the respective column of configuration bits. Parity may be odd (or even). The parity bit set/cleared makes an odd number of set bits, such that when a Power-On-Reset occurs and the configuration memory is clear, a parity error will be generated, indicating to the external control device 224 that the configuration has been altered and needs to be re-loaded. The AFE 228 may continuously check the row and column parity on the configuration memory map. If a parity error occurs, the AFE 228 may lower the SCLK/ALERT pin (interrupting the external control device 224) indicating the configuration memory has been corrupted/unloaded and needs to be reprogrammed. Parity errors do not interrupt the AFE 228 operation, but rather indicate that the contents in the configuration registers may be corrupted or parity bit is programmed incorrectly.

Antenna input protection may be used to prevent excessive voltage into the antenna inputs (LCX, LCY and LCZ of FIG. 3). RF limiter circuits at each LC input pin begin resistively de-Q'ing the attached external LC antenna when the input voltage exceeds the threshold voltage, $V_{DE\_Q}$. The limiter de-Q'es harder, proportional to an increasing input voltage, to ensure the pin does not exceed the maximum allowed silicon input voltage, $V_{LC}$, and also to limit an input signal to a range acceptable to the internal AGC amplifier.

LF talk back may be achieved by de-Q'ing the antenna 220 with a modulation field effect transistor (MOD FET) so as to modulate data onto the antenna voltage, induced from the base station/transponder reader (not shown). The modulation data may be from the external control device 224 via the digital SPI interface as "Clamp On," "Clamp Off" commands. The modulation circuit may comprise low resistive NMOS transistors that connect the three LC inputs to LCCOM. Preferably the MOD FET should turn on slowly (perhaps 100 ns ramp) to protect against potential high switching currents. When the modulation transistor turns on, its low turn-on resistance ($R_M$) damps the induced LC antenna voltage. The antenna voltage is minimized when the MOD FET turns-on and is maximized when the MOD FET turns-off. The MOD FET's low turn-on resistance ($R_M$) results in a high modulation depth.

Power-On-Reset (not shown) may remain in a reset state until a sufficient supply voltage is available. The power-on-reset releases when the supply voltage is sufficient for correct operation, nominally $V_{POR}$. The configuration registers may all be cleared on a Power-On-Reset. As the configuration registers are protected by row and column parity, the $\overline{ALERT}$ pin will be pulled down—indicating to the external control device 224 that the configuration register memory is cleared and requires loading.

The LFDATA digital output may be configured to either pass the demodulator output, the carrier clock input, or receiver signal strength indicator (RSSI) output. The demodulator output will normally be used as it consists of the modulated data bits, recovered from the amplitude modulated (AM) carrier envelope. The carrier clock output is available on the LFDATA pin if the carrier clock output is selected by the configuration setting. The carrier clock signal may be output at its raw speed or slowed down by a factor of four using the carrier clock divide-by configuration. Depending on the number of inputs simultaneously receiving signal and the phase difference between the signals, the resulting carrier clock output may not be a clean square wave representation of the carrier signal. If selected, the carrier clock output is enabled once the preamble counter is passed. When the LFDATA digital output is configured to output the signal at the demodulator input, this carrier clock representation may be output actual speed (divided by 1) or slowed down (divide by 4). If the Received Signal Strength Indicator (RSSI) is selected, the device outputs a current signal that is proportional to the input signal amplitude.

Referring to FIG. 12, depicted is an exemplary SPI timing diagram. The SPI interface may utilize three signals: active low Chip Select ($\overline{CS}$), clock (SCK) and serial data (SDIO). The SPI may be used may be used by the external control device 224 for writing to and reading from the configuration registers and controlling the circuits of the AFE 228.

Referring to FIG. 13, depicted is an exemplary table showing the bit organization of the configuration registers. As depicted each configuration register has nine bits, however, it is contemplated and within the scope of the invention that the configuration registers may have more or less than nine bits. Bit 0 of each register may be row parity for that register. All registers except register 7 may be readable and re-writable. Register 6 may be the column parity bit register, wherein each bit of the register 6 may be the parity bit of the combination of bits, arranged per column, of the corresponding registers. Register 7 may be a status register of circuit activities of the AFE 228, and may be read only. For example, the status register 7 may indicate which channel caused an output to wake-up the AFE 228, indication of AGC circuit activity, indication of whether the "Alert Output Low" is due to a parity error or noise alarm timer time out, etc.

FIG. 14 is an exemplary table of SPI commands to the AFE transponder circuits and configuration registers thereof.

The present invention has been described in terms of specific exemplary embodiments. In accordance with the present invention, the parameters for a system may be varied, typically with a design engineer specifying and selecting them for the desired application. Further, it is contemplated that other embodiments, which may be devised readily by persons of ordinary skill in the art based on the teachings set forth herein, may be within the scope of the invention, which is defined by the appended claims. The present invention may be modified and practiced in different but equivalent manners that will be apparent to those skilled in the art and having the benefit of the teachings set forth herein.

What is claimed is:

1. A remote keyless entry (RKE) transponder, comprising:
   a multi-channel analog front-end (AFE) and a plurality of antennas, wherein each channel of the multi-channel AFE is coupled to a one of the plurality of antennas;
   a tuning circuit for each channel of the multi-channel AFE, each tuning circuit having a plurality of tuning capacitors internal to the multi-channel AFE, wherein the tuning circuit couples a combination of the plurality of tuning capacitors to a respective one of the plurality of antennas so that the respective one of the plurality of antennas is tuned to a desired frequency;
   at least one antenna configuration register for storing each combination of the plurality of capacitors required for tuning each of the respective ones of the plurality of antennas; and
   a low frequency talk-back circuit for sending data back to a low frequency base station, wherein the low frequency talk-back circuit comprises a de-queuing circuit for clamping and unclamping a voltage on at least one of the plurality of antennas, wherein the dc-queuing circuit is controlled by an external control device.

2. The RKE transponder according to claim 1, wherein the plurality of tuning capacitors are arranged in about 1 pF steps.

3. The RKE transponder according to claim 1, wherein automatic gain control (AGC) of the channel is held at a fixed value during tuning of the respective antenna.

4. The RKE transponder according to claim 1, wherein the desired frequency is at a frequency from about 100 kHz to about 400 kHz.

5. The RKE transponder according to claim 1, wherein the desired frequency is about 125 kHz.

6. The RKE transponder according to claim 1, wherein each channel of the multi-channel AFE can be individually enabled or disabled depending upon a channel enable configuration stored in the at least one configuration register.

7. The RKE transponder according to claim 1, wherein the multi-channel APE comprises three channels.

8. The RKE transponder according to claim 1, further comprising:
   the multi-channel AFE having configurable parameters;
   a plurality of parameter configuration registers for storing the configurable parameters of the multi-channel AFE, wherein the external control device writes to and reads from the plurality of parameter configuration registers.

9. The RKE transponder according to claim 8, wherein the configurable parameters stored in the plurality of parameter configuration registers are parity checked.

10. The RKE transponder according to claim 8, wherein the configurable parameters stored in the plurality of parameter configuration registers are dynamically re-configurable.

11. The RKE transponder according to claim 10, wherein the external control device dynamically re-configures the configurable parameters stored in the plurality of parameter configuration registers.

12. The RKE transponder according to claim 8, wherein the external control device is coupled to the plurality of parameter configuration registers with a serial communications interface.

13. The RKE transponder according to claim 12, wherein the serial communications interface is selected from the group consisting of I²C, CAN, and SPI (Serial Peripheral Interface).

14. The RKE transponder according to claim 8, wherein the external control device is selected from the group consisting of digital processor, microcontroller, microprocessor, digital signal processor, application specific integrated circuit (ASIC), and programmable logic array (PLA).

15. The RKE transponder according to claim 8, wherein the configurable parameters are selected from the group consisting of input channel selection, individual channel disable, independently settable sensitivity for each channel, wake-up filter timing parameters, internal tuning capacitor selection for each channel's antenna, and minimum modulation depth requirement.

16. The RKE transponder according to claim 15, wherein an AFE output is selected from the group consisting of demodulated data, carrier clock, and received signal strength (RSSI).

17. The RKE transponder according to claim 16, wherein selection of the AFE output is determined by an output configuration stored in a one of the plurality of parameter configuration registers.

18. The RKE transponder according to claim 16, wherein the RSSI output is proportional to an input signal amplitude.

19. The RKE transponder according to claim 18, wherein the RSSI output is a current output.

20. The RKE transponder according to claim 8, further comprising a status register.

21. The RKE transponder according to claim 20, wherein the status register is read only.

22. The RKE transponder according to claim 20, wherein the status register indicates which channel of the multi-channel AFE caused a wake-up.

23. The RKE transponder according to claim 20, wherein the status register indicates automatic gain control (AGC) activity of the multi-channel AFE.

24. The RKE transponder according to claim 20, wherein the status register indicates parity errors occurring in the plurality of parameter configuration registers.

25. The RKE transponder according to claim 20, wherein the status register indicates a noise alarm for each channel of the multi-channel AFE that receives an unwanted input signal.

26. The RKE transponder according to claim 8, wherein each channel of the multi-channel AFE can be individually enabled or disabled depending upon a channel enable configuration stored in a one of the plurality of parameter configuration registers.

27. The RKE transponder according to claim 8, wherein the multi-channel AFE comprises three signal input channels.

28. The RKE transponder according to claim 8, wherein the multi-channel AFE has optimum input sensitivity at about 125 kHz.

29. The RKE transponder according to claim 8, wherein the multi-channel AFE is adapted to receive signals from about 100 kHz to about 400 kHz.

30. The RKE transponder according to claim 8, further comprising a column parity register that stores column parity bits for each column of bit positions of the plurality of parameter configuration registers.

31. The RKE transponder according to claim 30, wherein a bit of each of the plurality of configuration registers stores a row parity bit for that parameter configuration register.

32. The RKE transponder according to claim 31, wherein parity is odd.

33. The RKE transponder according to claim 31, wherein parity is even.

34. The RKE transponder according to claim 31, wherein when there is parity error the external control device reloads the configurable parameters to the plurality of parameter configuration registers.

35. The RKE transponder according to claim 8, wherein the AFE and the plurality of parameter configuration registers are fabricated on a first integrated circuit die, and the external control device is fabricated on a second integrated circuit die.

36. The RKE transponder according to claim 35, wherein the first integrated circuit die and second integrated circuit die are enclosed in an integrated circuit package.

37. The RKE transponder according to claim 36, wherein the integrated circuit package is part of a key fob.

38. The RKE transponder according to claim 37, wherein the key fob further comprises a radio frequency transmitter for longer range operation of the key fob.

39. The RKE transponder according to claim 8, wherein a minimum modulation depth requirement parameter determines a minimum modulation depth requirement of an input signal to be detected.

40. The RKE transponder according to claim 39, wherein the minimum modulation depth requirement parameter requires that modulation depth of a received signal be greater than or equal to 25 percent.

41. The RKE transponder according to claim 39, wherein the minimum modulation depth requirement parameter requires that modulation depth of a received signal be greater than or equal to 50 percent.

42. The RKE transponder according to claim 39, wherein the minimum modulation depth requirement parameter requires that modulation depth of a received signal be greater than or equal to 75 percent.

43. The RKE transponder according to claim 39, wherein the minimum modulation depth requirement parameter requires that modulation depth of a received signal be greater than or equal to 12 percent.

44. The RKE transponder according to claim 8, wherein each channel of the AFE has a gain of at least 100 dB dynamic range, wherein the gain is dynamically adjusted by automatic gain control (AGC).

45. The RKE transponder according to claim 44, wherein the AGC is held at a certain gain to prevent noise from interfering with a channel of the AFE.

46. The RKE transponder according to claim 1, wherein the external control device is coupled to the at least one antenna configuration register with a serial communications interface.

47. The RKE transponder according to claim 46, wherein the serial communications interface is selected from the group consisting of I²C, CAN, and SPI (Serial Peripheral Interface).

48. The RKE transponder according to claim 1, wherein the external control device is selected from the group consisting of microcontroller, microprocessor, digital signal processor, application specific integrated circuit (ASIC), and programmable logic array (PLA).

49. A method for a remote keyless entry (RKE) transponder, said method comprising the steps of:

providing a multi-channel analog front-end (AFE);

providing an antenna for each channel of the multi-channel AFE;

coupling each channel to its respective antenna;

tuning each channel antenna to a desired frequency by coupling some combination of a plurality of tuning capacitors to the channel antenna;

storing, in at least one configuration register, the combinations of the plurality of tuning capacitors used to tune each of the channel antennas to the desired frequency; and sending data back to a low frequency base station by clamping and unclamping a voltage on at least one of the antennas.

50. The method according to claim 49, wherein the step of coupling the some combination of the plurality of tuning capacitors to the channel antenna is performed in about 1 pF steps.

51. The method according to claim 49, further comprising the step of holding automatic gain control (AGC) of the channel to a fixed value during tuning of the respective antenna.

52. The method according to claim 49, wherein the desired frequency is at a frequency from about 100 kHz to about 400 kHz.

53. The method according to claim 49, wherein the desired frequency is about 125 kHz.

54. The method according to claim 49, wherein the multi-channel AFE comprises three channels.

55. The method according to claim 49, wherein the steps of tuning and coupling are controlled by an external control device.

56. The method according to claim 55, further comprising the step of writing to the at least one configuration register with the external control device.

57. The method according to claim 55, further comprising the step of reading from the at least one configuration register with the external control device.

58. The method according to claim 55, wherein the external control device is selected from the group consisting of digital processor, microcontroller, microprocessor, digital signal processor, application specific integrated circuit (ASIC), and programmable logic array (PLA).

59. The method according to claim 49, wherein the step of sending data back to the low frequency base station by clamping and unclamping the voltage on the at least one of the antennas comprises the steps of de-queuing and queuing the at least one of the antennas.

60. The method according to claim 59, wherein the steps of de-queuing and queuing the at least one of the antennas is performed with an external control device.

61. The method according to claim 49, wherein the clamping takes place by receiving a "clamp on" SPI command from an external device.

62. The method according to claim 61, wherein the external device is a microcontroller.

63. The method according to claim 49, wherein the unclamping takes place by receiving a "clamp off" SPI command from an external device.

64. The method according to claim 63, wherein the external device is a microcontroller.

65. The method according to claim 49, further comprising the step of placing the AFE into a sleep mode by sending a sleep command from the external device.

66. The method according to claim 65, wherein when the AFE is in the sleep mode it draws the least amount of power.

67. The method according to claim 65, wherein the AFE exits the sleep mode by receiving any command other than the sleep command or a power-on reset.

68. The method according to claim 49, further comprising the step of sending an AGC preserve command to hold a current AGC level.

69. The method according to claim 49, further comprising the step of sending an AGC preserve off command to enable tracking of a new AGC level.

70. The method according to claim 49, further comprising the step of sending a soft reset command to soft reset the AFE.

71. The method according to claim 49, further comprising the step of sending a soft reset command to soft reset bits in a status register.

72. The method according to claim 49, further comprising the steps of:

providing the multi-channel AFE with configurable parameters; and storing the configurable parameters in a plurality of parameter configuration registers.

73. The method according to claim 72, further comprising the step of writing the configurable parameters into the plurality of parameter configuration registers with an external control device.

74. The method according to claim 73, wherein the step of writing the configurable parameters into the plurality of parameter configuration registers with the external control device further comprises the step of dynamically re-configuring at least one of the parameters stored in the plurality of parameter configuration registers.

75. The method according to claim 73, wherein the external control device is selected from the group consisting of digital processor, microcontroller, microprocessor, digital signal processor, application specific integrated circuit (ASIC), and programmable logic array (PLA).

76. The method according to claim 72, wherein the configurable parameters are selected from the group consisting of individual input channel selection, individual channel disable, independently settable sensitivity for each channel, wake-up filter timing parameters, automatic gain control hold, internal tuning capacitor selection for each channel's antenna, minimum modulation depth requirement, and bi-directional talk back.

77. The method according to claim 72, further comprising the step of indicating with a status register which channel of the multi-channel AFE caused a wake-up from a received signal.

78. The method according to claim 72, further comprising the step of indicating with a status register automatic gain control (AGC) activity of the multi-channel AFE.

79. The method according to claim 78, further comprising the step of storing the calculated parity in a respective one of the plurality of parameter configuration registers.

80. The method according to claim 78, further comprising the step of indicating a parity error occurring in any of the plurality of parameter configuration registers.

81. The method according to claim 72, further comprising the step of calculating parity of the parameters stored in each of the plurality of parameter configuration registers.

82. The method according to claim 72, further comprising the steps of calculating row parity for each of the parameters stored in each of the plurality of parameter configuration registers and column parity for each column of the plurality of configuration registers arranged in a matrix.

83. The method according to claim 82, further comprising the step of storing the calculated column parity for each column of the plurality of parameter configuration registers in a column parity register.

84. The method according to claim 83, further comprising the step of indicating that a parity error is present in the column parity register.

85. The method according to claim 72, further comprising the step of decoding a signal received by the multi-channel AFE when the received signal modulation depth is equal to or greater than a minimum modulation depth requirement parameter.

86. The method according to claim 85, wherein the minimum modulation depth requirement parameter is 25 percent.

87. The method according to claim 85, wherein the minimum modulation depth requirement parameter is 50 percent.

88. The method according to claim 85, wherein the minimum modulation depth requirement parameter is 75 percent.

89. The method according to claim 85, wherein the minimum modulation depth requirement parameter is 12 percent.

90. The method according to claim 72, further comprising the step of dynamically adjusting the gain of each channel of the multi-channel AFE.

91. The method according to claim 90, wherein each of the channels has a 100 dB dynamic range adjustable gain that is dynamically adjustable with an automatic gain control (AGC).

* * * * *

UNITED STATES PATENT AND TRADEMARK OFFICE
CERTIFICATE OF CORRECTION

PATENT NO. : 7,602,274 B2 Page 1 of 1
APPLICATION NO. : 11/079719
DATED : October 13, 2009
INVENTOR(S) : Thomas Youbok Lee et al.

It is certified that error appears in the above-identified patent and that said Letters Patent is hereby corrected as shown below:

Claim 1, Column 18, Line 24 of the issued grant needs correction: The phrase "wherein the dc-queuing circuit is controlled by an external control device" should be changed to --wherein the de-queuing circuit is controlled by an external control device--.

Claim 7, Column 18, Line 41 of the issued grant needs correction: The phrase "wherein the multi-channel APE comprises three channels" should be changed to --wherein the multi-channel AFE comprises three channels--.

Signed and Sealed this

Second Day of March, 2010

David J. Kappos
*Director of the United States Patent and Trademark Office*